Aug. 9, 1955     A. A. BADLER     2,714,768
GROUND AERATING SANDAL
Filed Aug. 4, 1954
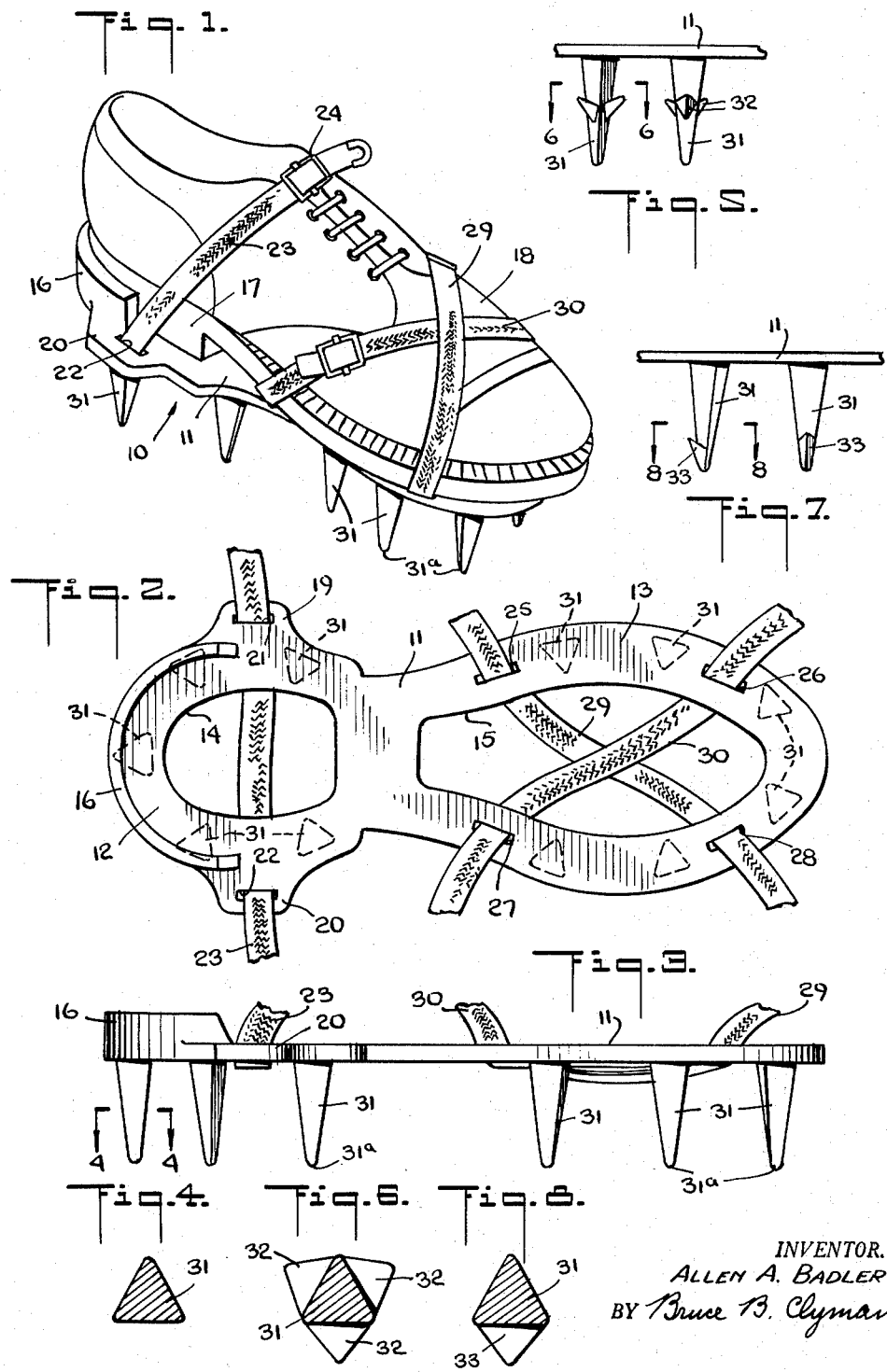
INVENTOR.
ALLEN A. BADLER
BY Bruce B. Clyman
ATTORNEY United States Patent Office 2,714,768
Patented Aug. 9, 1955

2,714,768

GROUND AERATING SANDAL

Allen A. Badler, New York, N. Y.

Application August 4, 1954, Serial No. 447,804

3 Claims. (Cl. 36—1)

The present invention relates to a ground aerating sandal and, more particularly, it relates to a metal sandal which may be easily adjusted to the wearer's shoe and which has a plurality of ground piercing spikes disposed along the bottom thereof so that the wearer may utilize his own weight for aerating the ground.

The technique of aerating the ground is a relatively new one and it has recently been found that such ground aeration enhances the growth of flowers, vegetables, fruits and other plant life. Attempts have been made to aerate the ground by providing a heavy roller with a spiked surface. Such rollers have been highly unsuccessful and impractical because they require a substantial amount of force in order to penetrate the ground. This requires either an extremely heavy roller or applied pressure from the person using the roller. In either case, the manipulation of the roller is extremely tiring on the user and he cannot aerate too large an area of ground without becoming rapidly fatigued. Some persons have used a long rod with a pronged end to punch holes in the ground, but this too is a very tiring procedure.

In accord with my invention, I have provided a metal sandal which may be easily bound to the wearer's shoe by a unique strap arrangement which is applicable to any size shoe. A plurality of spikes are provided along the bottom of the sandal so that the wearer may utilize his own weight to force the spikes into the ground and thereby aerate the ground. The spikes are of such shape that they can easily enter the hardest ground. At the same time, very little effort is required to extricate the spikes from the ground.

It is therefore an object of the present invention to provide a ground aerating sandal having a spiked bottom designed to enter into the ground with a minimum of resistance. This sandal may be worn in conjunction with the user's shoe.

Another object of the present invention is to provide a modified form of my ground aerating sandal by which the ground may be broken at the same time as it is being aerated. This particular form contemplates the use of a plurality of spikes having barbed elements attached thereto for uplifting the ground.

One advantage of my invention is that it employs a strap arrangement that permits it to be worn with any type or size shoe. Moreover, the straps are so positioned that the sandal will not come loose from or injure the wearer's shoe.

Another advantage of my invention is that its use does not fatigue the wearer and he is able to aerate relatively large areas of ground merely by walking over the ground. This is particularly important where the sandal is worn by older persons for aerating their home gardens. When using my sandal, a person's hands are always free to plant, seed, pull weeds or trim any plants or foliage.

A still further advantage of my invention is that it is very light in weight, simple to construct and inexpensive to manufacture and yet sturdy and durable for long periods of use.

Other objects and advantages of the present invention will become more apparent as it is described in detail below with particular reference to the accompanying drawing wherein, Figure 1 is a view in perspective showing my ground aerating sandal as worn with a shoe;

Figure 2 is a plan view of my ground aerating sandal;

Figure 3 is a side view in elevation of my ground aerating sandal;

Figure 4 is a sectional view taken on line 4—4 of Figure 3 and looking in the direction of the arrows;

Figure 5 is a fragmental side elevational view showing a modified type of spike that may be employed with my sandal;

Figure 6 is a sectional view taken on line 6—6 of Figure 5 and looking in the direction of the arrows;

Figure 7 is a fragmental side elevational view showing a still further form of spike that may be employed with my sandal; and Figure 8 is a sectional view taken on line 8—8 of Figure 7 and looking in the direction of the arrows.

With particular reference to Figures 1, 2 and 3, there is shown a ground aerating sandal 10 comprising a flat aluminum plate 11, which plate generally has the outline of the bottom of a shoe. The aluminum plate 11 has a heel portion 12 and a sole portion 13, which are integrally connected to each other. In order to eliminate any excess weight in the ground aerating sandal 10, the heel portion 12 and the sole portion 13 are provided with centrally located openings 14 and 15, respectively. As best seen in Figure 2, each opening has the general outline of its corresponding heel or sole portion.

Disposed around the rear edge of the heel portion 12 and extending upwardly therefrom is a flange 16 which serves to receive the rear portion of a heel 17 of a conventional shoe 18. Extending outwardly from either side of the heel portion 12 but integrally affixed thereto are a pair of wings 19 and 20. Each wing 19 and 20 has an elongated slot 21 and 22, respectively, which extends parallel to the central axis of the ground aerating sandal 10. These slots 21 and 22 are adapted to receive the strap 23 which extends under the heel portion 12 and may be fastened around the top of the conventional shoe 18 and ankle of the wearer, as seen in Figures 1 and 2. A conventional buckle arrangement 24 is provided at one end of the strap to hold it in place.

On either side of the sole portion 13 are a further pair of elongated slots 25 and 26 and 27 and 28. Slots 25 and 27 are located near the rear of the sole portion 13 whereas slots 26 and 28 are located near the front of the sole portion. All of the slots are generally parallel to the edges of the sole portion 13 to which they are nearest. Each pair of diagonally opposite slots are adapted to receive a strap which is used to bind the front portion of the wearer's shoe 18 to the sole portion 13. For example, slots 25 and 28 receive the strap 29 which extends under the sole portion 13 and out through the slots, whereas the diagonally opposite slots 26 and 27 receive the strap 30, all of which is seen in Figures 1 and 3. The straps 29 and 30 are purposely positioned in diagonal fashion so as to prevent the shoe 18 of the wearer from slipping on the aluminum plate 11. Moreover, this arrangement of the diagonal straps also permits the sandal 10 to be worn with any type or size shoe.

Buckles such as buckle 24 are also provided on the ends of the straps 29 and 30 to facilitate the binding of the ground aerating sandal 10 to the shoe 18.

Extending downwardly from the bottom of the heel portion 12 and the sole portion 13 are a plurality of spikes 31. These spikes 31, which are three-sided, taper downwardly to points 31a. The spikes 31 are so shaped that a horizontal cross-section through one would form an equilateral triangle, as seen in Figure 4. Preferably the spikes 31 have a length of from one and one-half inches to two inches. I have found that the best results are obtained with a spike of such length. If the spikes 31 are longer than two inches, there is a good possibility that the spikes will become so embedded in the ground that the wearer will not be able to pull the spikes out of the ground without a considerable amount of effort. On the other hand, if the spikes 31 are shorter than one and one-half inches, the holes formed in the soil will be inadequate for aeration.

It should also be noted that each ground aerating sandal 10 is of identical shape so that there is no necessity to match one to the left shoe and the other to the right shoe.

When it is desired to employ my invention, the wearer takes a sandal 10, and places his shoe 18 on the sandal with the rear of the heel 17 abutting against the flange 16. He then fastens the straps 23, 29 and 30 around his foot and shoe 18 in the manner shown in Figure 1. Next he places a second sandal 10 on his other shoe 18. Of course, only one sandal 10 may be employed, if desired. The user is now able to walk over the ground that is to be aerated. As he walks along, his weight is sufficient to cause piercing of the ground by the spikes 31. At the same time, he may throw seeds about the ground for planting, weed the ground, or do any other chore that would require the use of his hands. Now that my invention has been fully described, it is obvious that my ground aerating sandal 10 is unique in that it permits the wearer to perform other functions while aerating the ground. Moreover, no longer need he expend his energy pulling a heavy roller about the ground or in forcing a pronged rod into the ground.

In Figures 5 and 6 there is shown a further form of my ground aerating sandal 10, which is to be used when it is desired to break up the ground as well as aerate it. In this form, each spoke 31 has integrally affixed thereto three upwardly extending and spaced-apart spurs 32. Each spur 32 is located on a face of a spike 31 approximately halfway up the spike. As the wearer moves about over the ground, these spurs 32 will enter the ground along with the spike 31. However, as the spikes 31 are removed from the ground, each spur 32 will uplift some ground so as to break it up.

In Figures 7 and 8, there is shown still a further form of spike 31 which is adapted for breaking the ground. This particular form of spike 31 has a single spur 33 integrally affixed thereto which extends upwardly and is located at the tapered end of the spike. Since this spur 33 is located at the end of the spike 31, it will extend deeply into the ground. It is therefore used particularly where it is desired to uproot deeper sections of the ground.

While my invention has been described in detail and shown with respect to the accompanying drawing, it is not to be limited to such details, since many changes and modifications may be made in the invention without departing from the spirit and scope thereof. For example, a conical spike may be employed. Hence, it is desired to cover any and all forms and modifications of the invention which may come within the language and scope of any one or more of the appended claims.

I claim:

1. A ground aerating sandal comprising a rigid metal base plate, said base plate having a heel portion and a sole portion, a flange extending upwardly from the rear edge of said heel portion, said base plate being provided with a plurality of straps adapted to bind said sandal to the shoe of the wearer, and a plurality of downwardly extending and tapering spikes disposed along the bottom of said base plate and integrally affixed thereto, each said spike having spur means affixed thereto for uplifting the ground.

2. A ground aerating sandal in accord with claim 1 wherein said spur means is located adjacent the piercing end of each said spike.

3. A ground aerating sandal in accord with claim 1 wherein said spur means is located approximately midway between the top and bottom of each said spike.

References Cited in the file of this patent

UNITED STATES PATENTS

| 442,003 | Armstrong | Dec. 2, 1890 |
| 577,475 | Zandalazini | Feb. 23, 1897 |
| 1,034,508 | Quackenbush | Aug. 6, 1912 |
| 2,061,962 | Gabriele | Nov. 24, 1936 |

FOREIGN PATENTS

| 523,644 | Great Britain | July 18, 1940 |